R. E. BOWEN.
Cotton-Planters.

No. 141,753.

Patented August 12, 1873.

Witnesses:
G. Mathys
Solon Kemon

Inventor:
Robert E. Bowen
Per _____
Attorneys.

UNITED STATES PATENT OFFICE.

ROBERT E. BOWEN, OF GEORGE'S CREEK, SOUTH CAROLINA.

IMPROVEMENT IN COTTON-PLANTERS.

Specification forming part of Letters Patent No. 141,753, dated August 12, 1873; application filed June 17, 1873.

*To all whom it may concern:*

Be it known that I, R. E. BOWEN, of George's Creek, in the county of Pickens and State of South Carolina, have invented a new and Improved Cotton-Planter; and I do hereby declare the following to be a full, clear, and exact description of the same, reference being had to the accompanying drawing forming part of this specification, in which—

Figure 1:
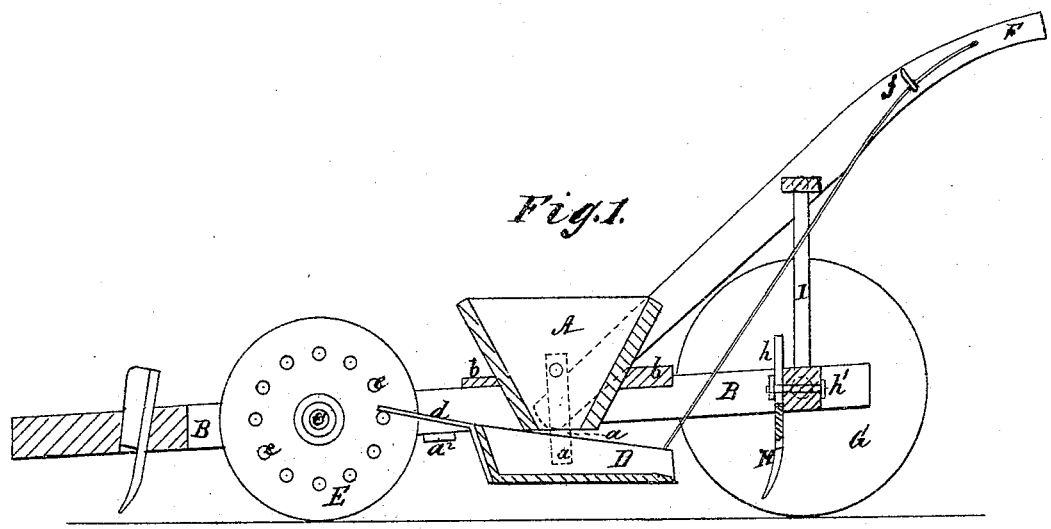
Figure 2:
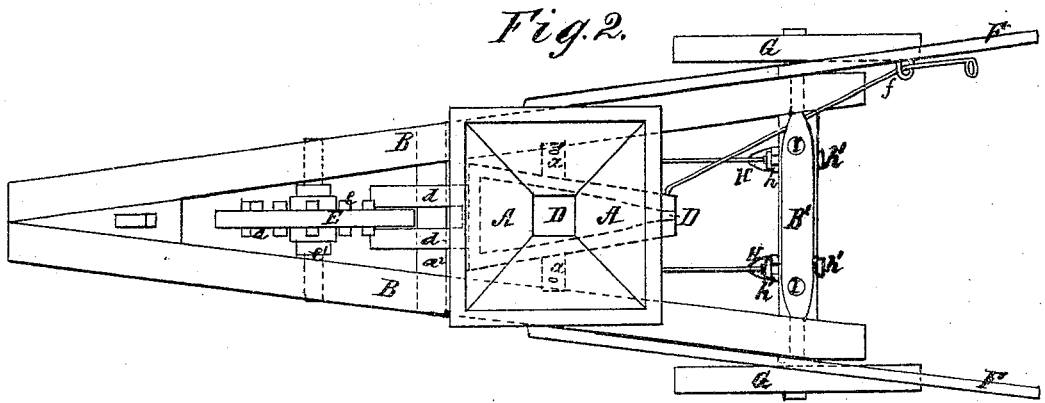

Figure 1 is a longitudinal sectional elevation; and Fig. 2 a plan view, the several features of my invention being clearly shown.

My invention consists in a certain arrangement of distributing-spout with relation to other parts, whereby the escape of seed can be easily and quickly arrested, as hereinafter described.

In the drawing, A represents a hopper placed between the two longitudinal pieces B B that converge toward the front, where is placed a furrowing-plow, adjustable by a wedge in the usual way. This hopper rests upon two cross-pieces, $b\ b$, and to it is subjacently hung, by flexible connections $a\ a$, a shaker-spout, D, whose inside cavity converges from front to rear, and whose heavy end is provided with arms $d\ d$, that rest on the side pins $e\ e$ of a front wheel, E. The latter is placed in the middle vertical and longitudinal plane of the machine, and its shaft $e'$ is journaled in the side pieces B B. At the small and rear end of the shaker is attached a rod or other suitable connection, which passes up through a keeper, $f$, of one of the handles F F, and comes within easy reach of the operator. It may also be made to fasten in a catch, ratchet, or other device for holding it.

The object of this is to enable the driver, when he arrives at the end of a row or "land," to lift and draw back the shaker, so that the pins of front wheel will no longer strike the arms $d\ d$, but so that they will be permitted to rest on a cross strap, plate, or bar, $a^2$. This effectually stops the distribution of seed until the turn of the planter has taken place, and it is in the proper position to again begin the operation.

G G are the rear wheels of the planter, of which the rear cross-piece B' may form the axle, as well as a part of the triangular frame B B B'. H H are covering-plows, having the bifurcated shanks $h\ h$, which enable them to be adjusted as to depth by simply moving them up and down across a clamp-screw, $h'$, placed on the inner side of the cross-bar B'. I I are uprights rising from the cross-bar B', and tenoned in the cross-piece J, to which the handles are attached so as to hold the latter firmly and rigidly in position.

This construction produces a planter of few parts, strong, efficient, and cheap.

I do not claim a swinging spout suspended from a hopper and agitated by means of a toothed wheel; but

I claim—

The combination, with the spout D, suspended from the hopper A, and provided with arms $d$, of the cross-bar $a^2$, arranged between said spout and the toothed wheel, and the adjusting-rod extending back to handles F, all as shown and described, to operate as specified.

ROBERT E. BOWEN.

Witnesses:
J. M. CURETON,
F. H. FULLER.